April 17, 1934.    G. HICKERSON ET AL    1,955,461
ROTARY ENGINE
Filed Dec. 12, 1929    6 Sheets-Sheet 3
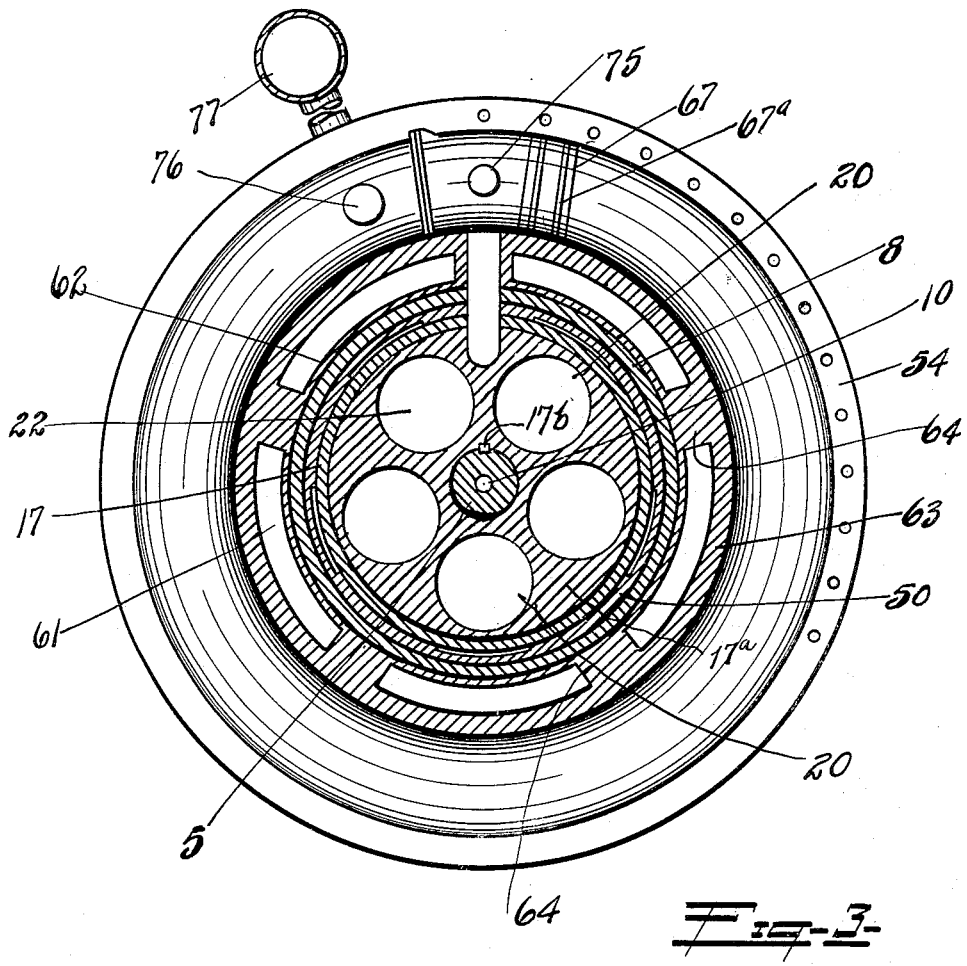
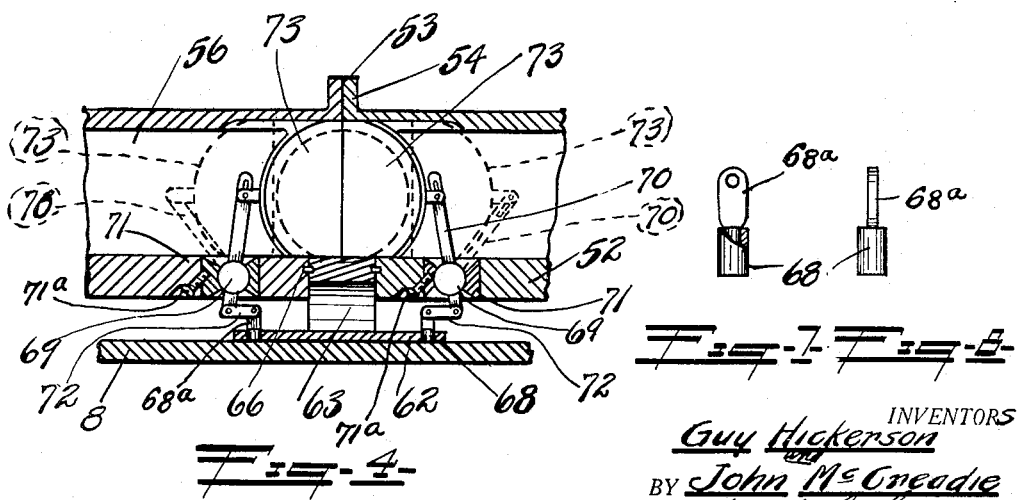
INVENTORS
Guy Hickerson
BY John McCreadie
Frank C Karman
ATTORNEY.

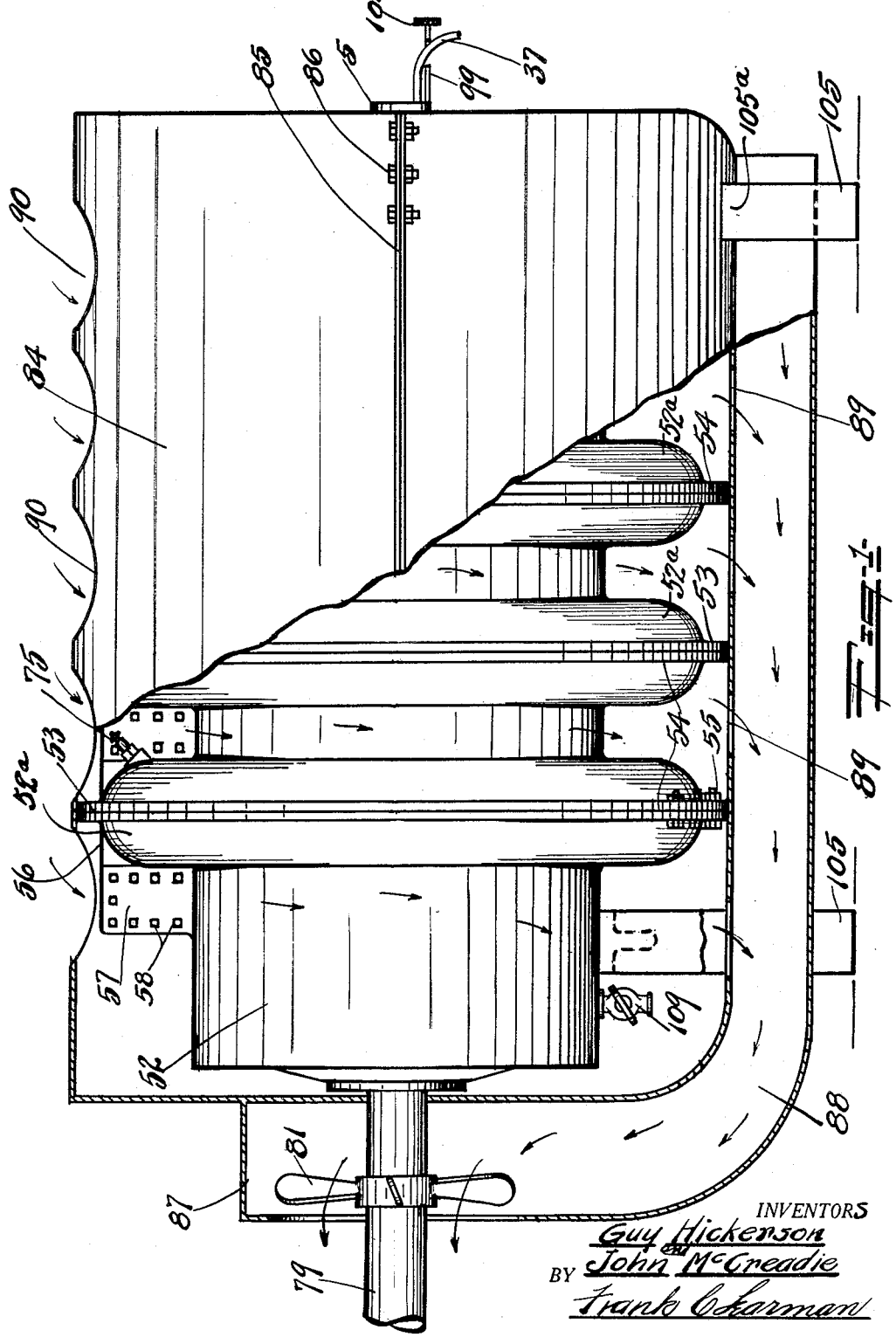

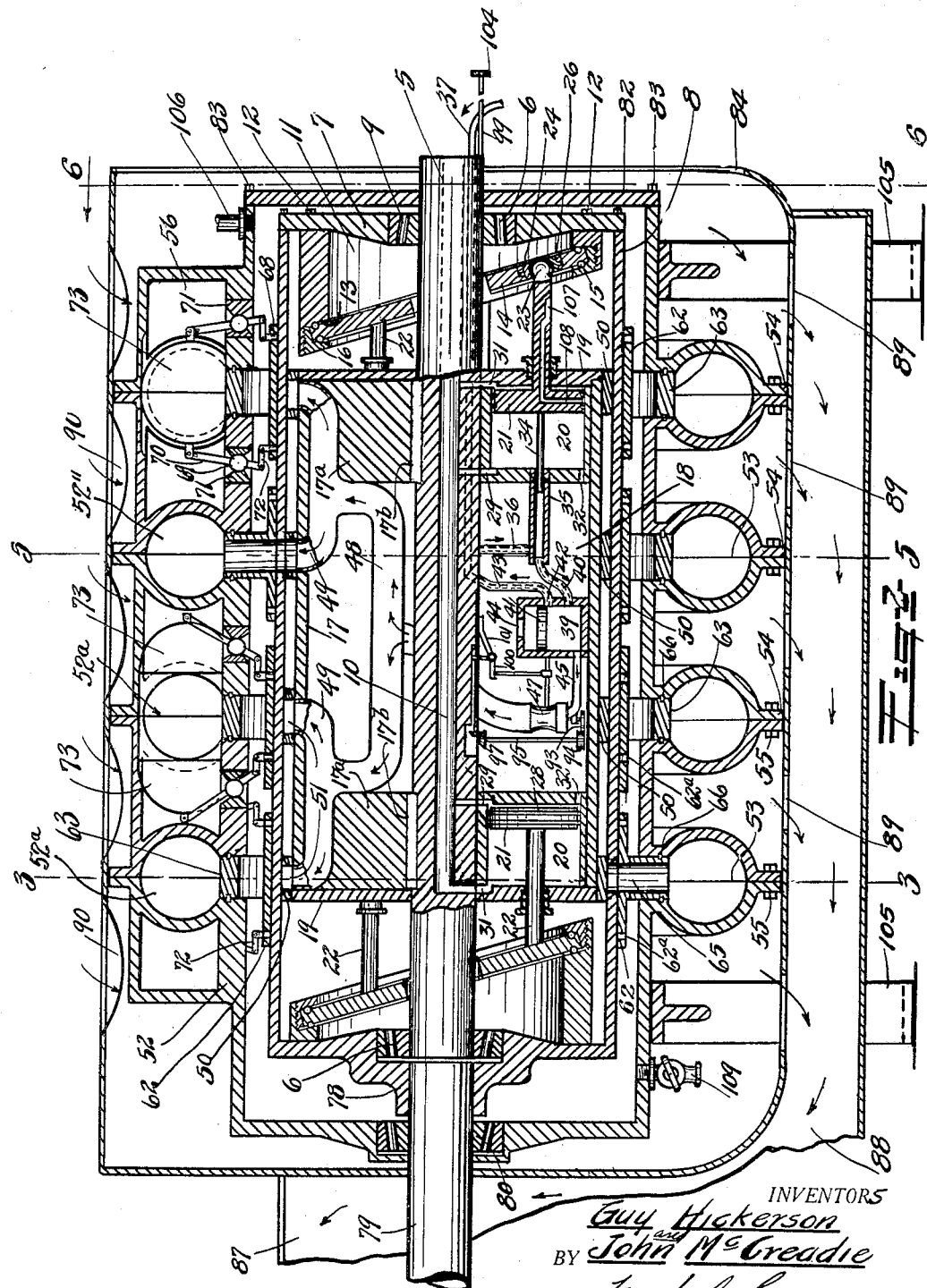

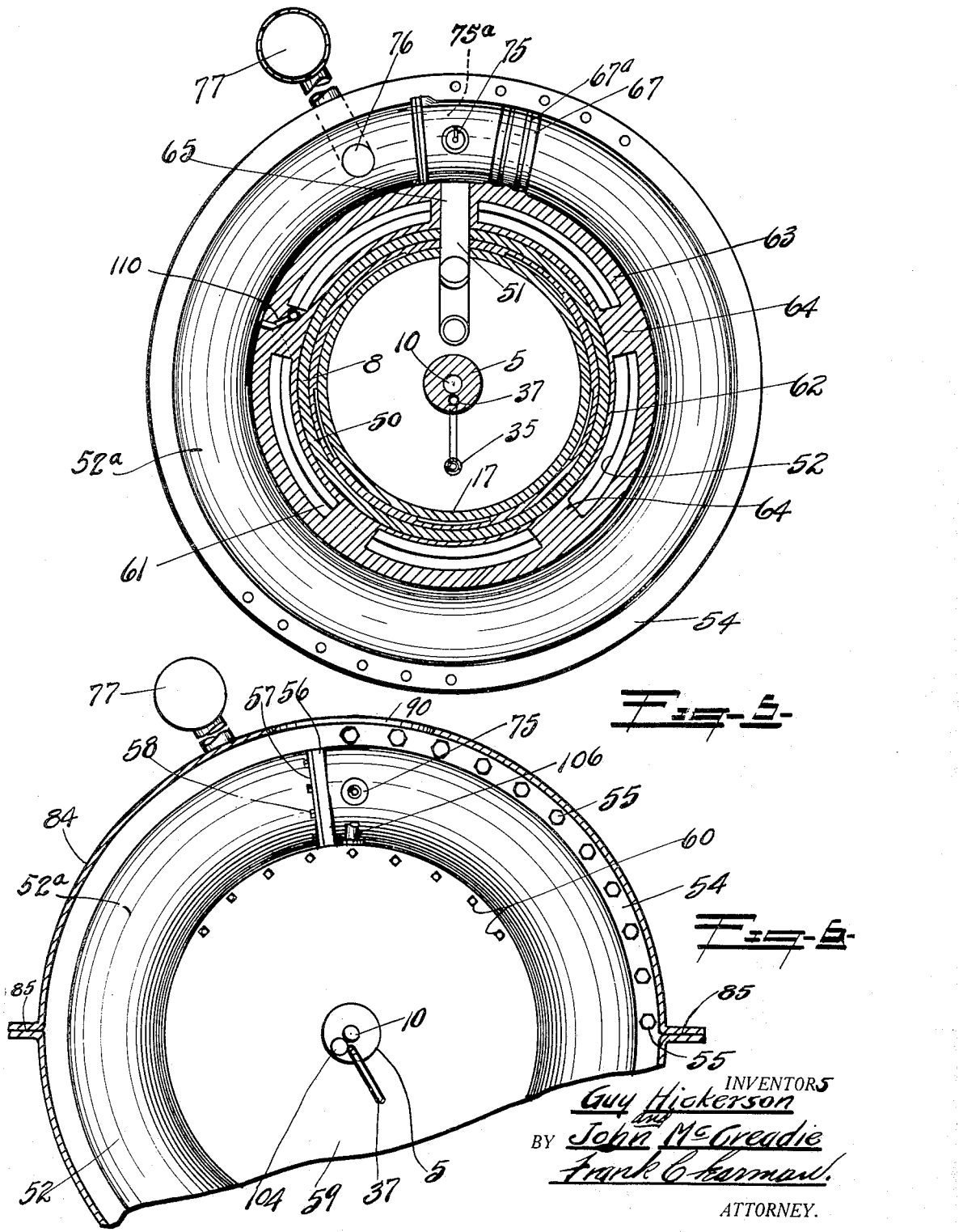

April 17, 1934.     G. HICKERSON ET AL     1,955,461
ROTARY ENGINE
Filed Dec. 12, 1929     6 Sheets-Sheet 5
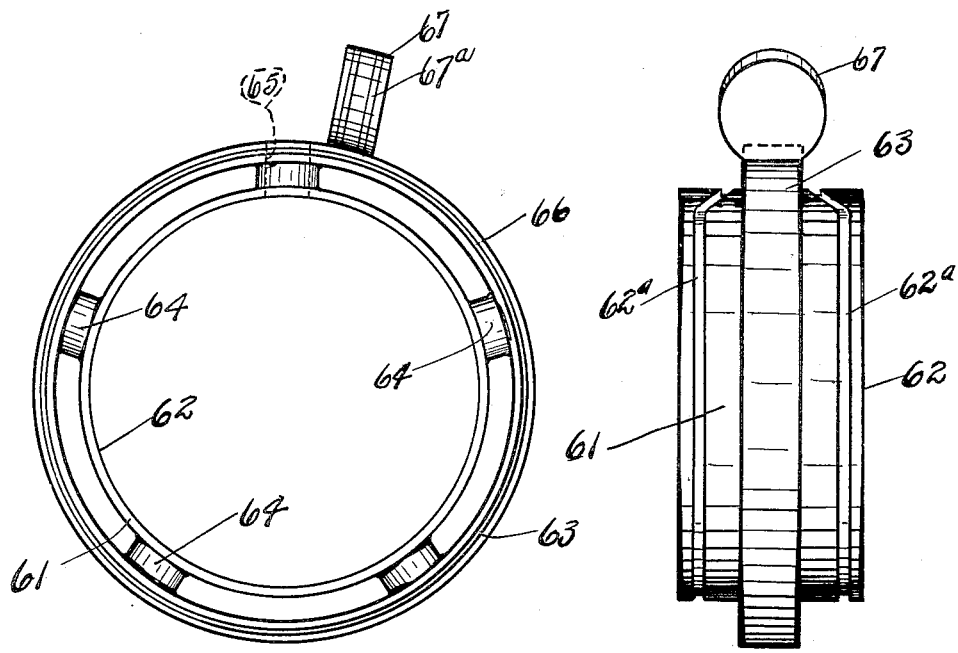
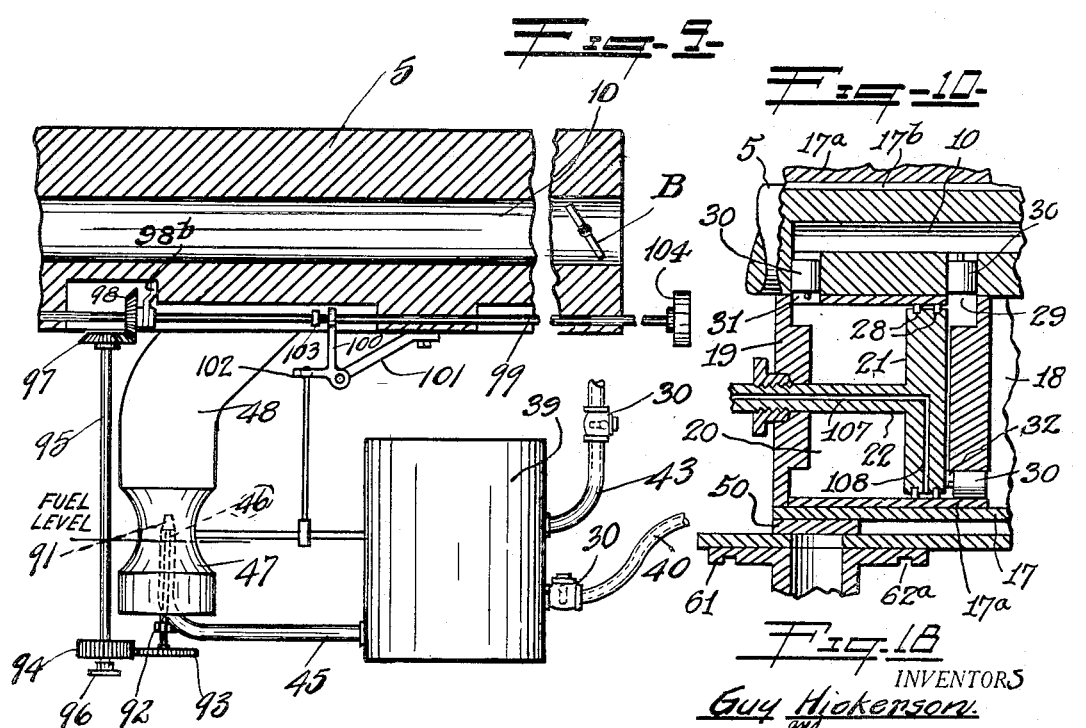
INVENTORS
Guy Hickerson
and
BY John McCreadie
Frank C Fearman
ATTORNEY.

April 17, 1934.　　G. HICKERSON ET AL　　1,955,461
ROTARY ENGINE
Filed Dec. 12, 1929　　6 Sheets-Sheet 6
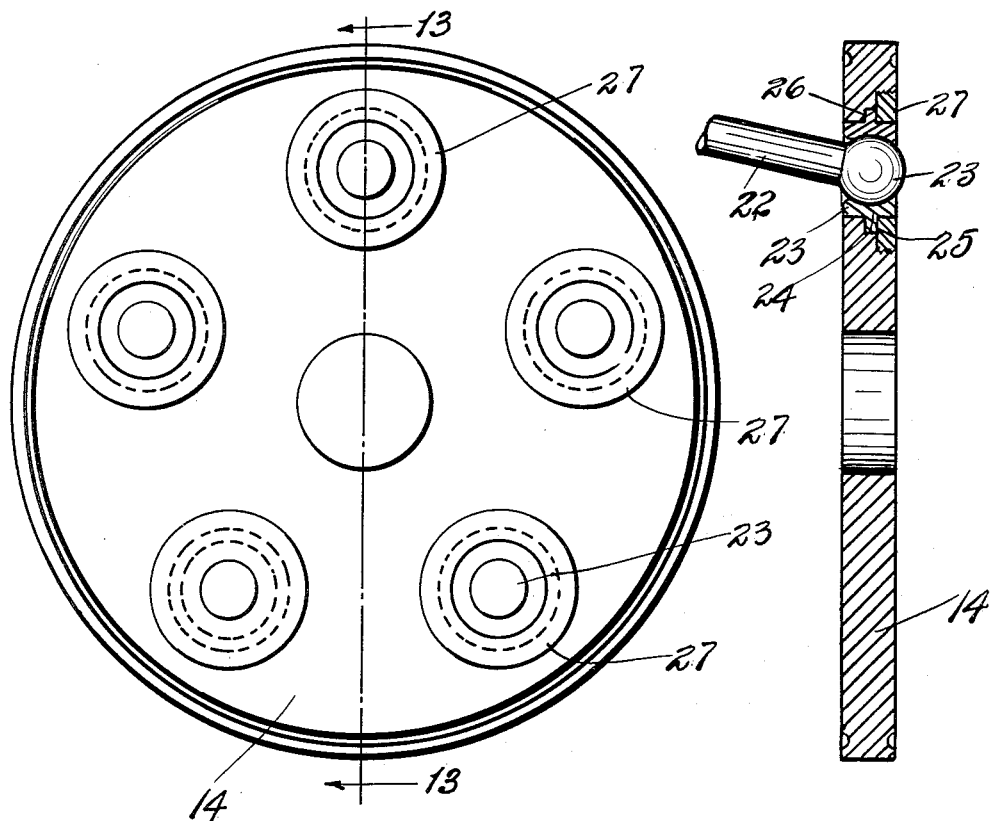
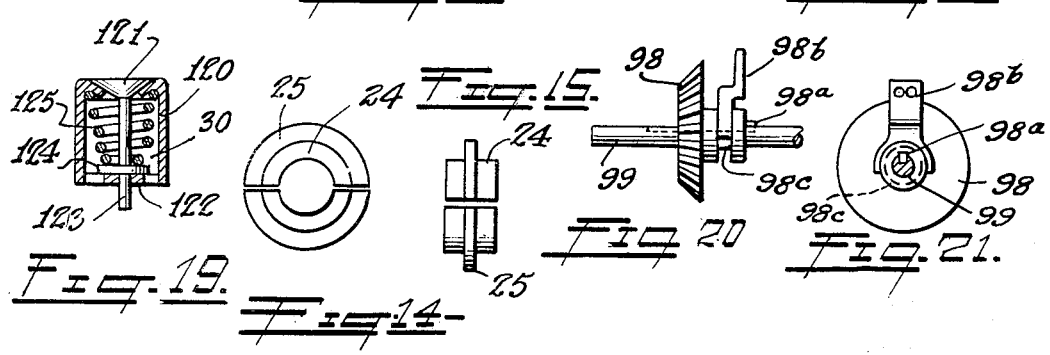
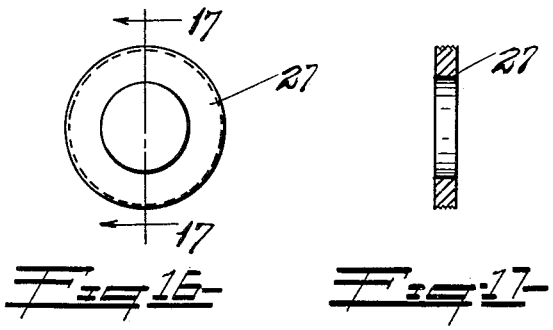
INVENTOR.
Guy Hickerson.
BY John McCreadie
Frank C. Farman.
ATTORNEY.

Patented Apr. 17, 1934

1,955,461

UNITED STATES PATENT OFFICE 1,955,461

ROTARY ENGINE

Guy Hickerson and John McCreadie, Midland, Mich.

Application December 12, 1929, Serial No. 413,620

16 Claims. (Cl. 123—14)

This invention relates to internal combustion engines and particularly to engines of the rotary type.

The prime object of the invention is to design a very simple, practical, and economical rotary engine, constructed in units, so that any desired power can be secured by adding additional units to the structure.

Another object is to design a very simple, and economical engine, the moving parts of which operate in an oil bath, which requires no exhaust valves nor crank shaft, and in which the center shaft also serves as a conduit for taking air into the motor.

A still further object is to provide an engine including a compressor housing, and provide means for compressing air in said housing as the motor is actuated.

A further object still is to provide an engine having a plurality of cylinders, and a rotatable member including pistons adapted to travel in said cylinders, together with means for forcing a fuel mixture under pressure into said cylinders.

A further object still is to design a motor composed of few parts which will be very light in weight, economical in operation and which is easily cooled.

With the above and other objects in view, the present invention consists in the combination and arrangement of parts, hereinafter more fully described, illustrated in the accompanying drawings, and particularly pointed out in the appended claims, it being understood that changes may be made in the form, size, proportion, and minor details of construction without departing from the spirit, or sacrificing any of the advantages of the invention.

In the drawings:

Fig. 1 is a side elevation of our improved motor part of the casing being broken away.

Fig. 2 is a longitudinal sectional view.

Fig. 3 is a transverse sectional view taken on the line 3—3 of Fig. 2.

Fig. 4 is an enlarged sectional view showing the abutment valve closed, the dotted lines showing it in open position.

Fig. 5 is a transverse sectional view taken on the line 5—5 of Fig. 2.

Fig. 6 is a fragmentary end view of the engine taken on the line 6—6 of Fig. 2.

Fig. 7 is a side view of the roller assembly on the end of the abutment actuating mechanism.

Fig. 8 is an edge view thereof.

Fig. 9 is a side view of the revolving ring to which the piston is secured.

Fig. 10 is a front view thereof.

Fig. 11 is a part sectional side view of the equalizing chamber, the gasoline jet, adjusting mechanism and manifold.

Fig. 12 is an enlarged view of the cam plate.

Fig. 13 is a vertical sectional view taken on line 13—13 of Fig. 12 and showing the connection of one of the piston stems.

Fig. 14 is a front view of one of the split bearings.

Fig. 15 is an edge view thereof.

Fig. 16 is a front view of one of the securing rings, and

Fig. 17 is a vertical sectional view taken on line 17—17 of Fig. 16.

Fig. 18 is an enlarged fragmentary sectional view of the stationary shaft, compressor, and check valves.

Fig. 19 is an enlarged sectional view of one of the check valves.

Fig. 20 is an enlarged fragmentary view illustrating the gear for operating the needle valve, together with the bracket and sliding key.

Fig. 21 is an end view of the mechanism shown in Fig. 20.

Referring now particularly to the drawings, the numeral 5 indicates a stationary center shaft which is mounted in bearings 6 provided in the end walls 7 of a cylindrical member 8, the inner shell of each bearing being shrunk on the shaft, and is equipped with rollers 9 in the usual manner, and on which the member 8 rotates, said shaft being provided with a centrally disposed passage 10 for a purpose to be presently described.

Cylindrical cam housings 11 are secured to each of the respective end walls of the member 8 by means of studs 12, and rotate therewith, a recess 13 being provided in each cam, and is adapted to receive a cam plate 14 therein, rows of antifriction balls 15 being provided on opposite sides of the plate, and an externally threaded ring 16 is threaded in the housing and serves to hold said plate in position.

A hollow shell member 17 is mounted on the center shaft 5 and forms a compressor housing, said housing including inwardly projecting end sections 17ª which are secured to the center shaft 5 by means of keys 17ᵇ, these end sections closely fit and form a closure for the end of the housing 17, each end section being provided with a cover plate 19 which can be secured in position in any desired manner. A plurality of spaced apart cylindrical bores are provided in the end sections 17ª of the compressor housing and form cylinders 20 in which pistons 21 are mounted, piston rods 22 being formed integral with said pistons, the outer end of each rod being provided with a ball shaped end 23 secured thereto in any desired manner, said end being mounted in a split bearing 24 having a rim 25 which fits the shouldered edge 26 of the cam plate, and an externally threaded ring 27 engages the threaded edge of the opening in the cam plate, moreover, all pistons are secured in a similar manner.

Piston rings 28 are provided in each piston, and a passage 29 opens into each cylinder from the hollow shaft, check valves 30 being provided in each passage to trap the air drawn into said cylinders. These check valves are of conventional design (see Fig. 19 of the drawings), and comprise a cylindrical shell 120, one end of which is shaped to provide a seat for the valve 121, a bearing 122 is provided in the opposite end, and the end of the valve stem 123 is journaled therein, a collar 124 being provided on the stem as shown, and a coil spring 125 is interposed between the end wall of the shell and the collar, so that when the valve is raised to admit air, the spring will be compressed, said spring serving to force the valve back to original position. Passages 31 are provided in the end sections 17ª of the compressor cylinders, so that the air back of the piston may escape on the outward stroke thereof, a similar passage 32 leading from each cylinder 20 into the chamber 18, and a check valve 30 is provided in said passage and through which the air is forced as the pistons are actuated. These check valves are all of similar design, and the specific construction is immaterial as it forms no part of the present invention.

One of these pistons is provided with a stem 34 which projects from the innerside thereof, extending into a pump cylinder 35, which is in turn threaded into the end section 17ª of the compressor, a laterally disposed pipe 36 opening into said pump cylinder at a point intermediate its length, and is connected to the main fuel line 37 provided in the shaft 5, thence leading to any suitable source of supply, a conventional check valve 30 being provided in said pipe 36 in the usual manner.

An equalizing chamber 39 is provided in the chamber 18, and a pipe 40 leads from said pump cylinder and opens into said chamber, a check valve 30 being provided in said pipe as usual. A float 41 is mounted in the equalizing chamber, and an overflow opening 42 is provided in the side wall in the chamber 39 at a point spaced from the intake, so that the fuel overflow may be returned to the main line through a return pipe 43, and a check valve 30 is provided in said pipe, all of these check valves being of similar design and as shown in Fig. 19 of the drawings. An opening 44 is provided in the upper end of the equalizing chamber, and serves to equalize the pressure on the float, so that the gas pressure in the chamber will be equal to the air pressure in the reservoir 18, a line 45 leads from the equalizing chamber and terminates in a gas jet 46 located in the Venturi tube 47 in the intake manifold 48, which is in turn connected to the various cylinders by branch lines 49.

Stationary ring valves 50 embrace the compressor housing and form a ground joint with the cylindrical member 8, ports 51 being provided in said ring and member and for a purpose to be presently described.

A cylinder block 52 surrounds the member 8, and is formed in sections as shown, each cylinder 52ª being split on the vertical center line 53, and is provided with flanges 54 which are secured together by means of bolts 55, an abutment case 56 being cast integral therewith, and plates 57 are provided for easy access thereto, and are secured in place by means of studs 58, an end plate 59 forming a closure for said block, and is held in position by means of the studs 60 see Fig. 6.

A cage ring 61 is mounted on the shell 8, see Fig. 5, and comprises inner and outer cylindrical ring members 62 and 63 respectively, said rings being connected together by means of spokes 64 cast integral therewith, one only of said spokes being bored to provide a passage 65 therethrough, sealing rings 66 are provided in the ring 63 as shown, and a piston 67 is secured thereto, or can be cast integral therewith, sealing ring 67ª being provided in the usual manner, the inner ring 62 is shrunk or otherwise suitably secured to the cylinder member 8, and is provided with spaced apart grooves 62ª in which the rollers 68 are seated, these rollers forming a part of the abutment valve actuating mechanism to be hereinafter described.

This actuating mechanism comprises a disk member 69 in which a lever 70 is anchored, said disk being rotatably mounted in a pair of block members 71, which are mounted in the cylinder block 52 at a point directly in alignment with the valve housing, and can be secured in position by means of screws 71ª, (not shown). A link 72 is pivotally connected to the lower end of the lever 70, the opposite end being connected to the upper end of the rod 68ª on which the roller 68 is mounted, the upper ends of the rods 70 being pivotally connected to the edges of the abutments 73 which are formed in pairs, the inner edges being V-shaped, and these abutments are so mounted that sufficient play is provided to insure a tight seat, and as the cylinder member and cage ring 61 rotate, it will be clearly obvious that the abutments will be actuated accordingly.

Spark plugs 75 are provided in the side wall of the combustion chamber 75ª, and an exhaust port 76 is provided directly adjacent each chamber, leading to and connecting to a main exhaust manifold 77 as usual, so that, as the charge is fired, the piston will be driven around, simultaneously driving ahead of it, and out of the exhaust port, the spent gases from the previous fired charge, the abutments open and close positively and sharply to permit the passage of the piston, and the intake of a fuel charge into the combustion chamber.

A hub 78 is cast integral with and on one end of the shell 8, being suitably recessed to accommodate the bearing 6, and one end of a drive shaft 79 is rigidly secured thereto, said shaft projecting through a bearing 80 provided in the end wall of the cylinder block, and an exhaust fan 81 is mounted on said shaft as shown, the opposite end of the block being provided with an end plate 82 secured in position by means of bolts 83.

A preferably sheet metal jacket 84 surrounds the engine, and is split as shown at 85, being secured together by means of bolts 86, and a fan housing 87 is formed with this housing having a duct 88 leading downwardly as shown, openings 89 providing connection between the cylindrical member and the duct, so that air is drawn through the openings 90, (which also permit ready access to the spark plugs) flows downwardly between the cylinder walls and into the duct 88, thence into the fan housing 87, thence being discharged by the fan 81, the course of the air currents being indicated by the numerous arrows shown in Figs. 1 and 2 of the drawings.

The discharge opening in the jet 46 is controlled by a needle valve 91 in the usual manner, the said needle valve being threaded, and is mounted in a threaded boss 92 provided on the pipe 45, a gear 93 being provided on the lower end of the needle valve, and is actuated by a similar gear 94 which is mounted on the shaft 95, said shaft being journaled in bearings 96, and a bevel gear 97 is provided on the upper end, meshing with and being driven by a similar gear 98 provided on the choke rod 99, and which is journaled in the shaft 5, said gear 98 having a sliding key 98ᵃ to permit the rod to slide therein, a bracket 98ᵇ being secured to the main shaft 5 and is formed with a forked lower end which engages in the groove 98ᶜ provided in the hub of the gear 98 (see Figs. 20 and 21 of the drawings). A lever 100 is journaled in a bracket 101 which is secured to the shaft 5, and has a laterally extending leg 102 adapted to engage the fuel float, a lug 103 being provided on the rod 99 and when the operator pulls outwardly on the choke rod 99 the lever 102 will be actuated accordingly. A knurled knob 104 is provided on the outer end of the choke rod to facilitate manipulation. Cast cradle brackets 105 support the engine in the usual manner, the shell being suitably recessed as at 105ᵃ to accommodate said brackets.

The lubrication of the moving parts of the engine, is very simple, an oil line 106 being connected to the one end of the cylinder block 52, oil is introduced into the chamber formed between the cylindrical member 8 and the cylinder block 52, and the casing is filled to the desired level, this lubricates the rings, cam bearing, and abutments actuating mechanism, as well as the ball joints, compressor pistons, and all moving parts. A passage 107 is provided in each compressor piston rod, and is connected to a passage 108 leading through the piston so that ample lubrication of the compressors is assured. A drain cock 109 is provided in the lower end of the block 52 for changing the oil when desired, and an oil passage 110 is provided in the spoke 64 in the cage ring 61 so that thorough lubrication is secured, a check valve 111 being provided as usual.

Air is taken into the compressors through the air duct 10 in the shaft 5, a conventional butterfly valve, B being provided on the outer end of the duct, fuel is drawn through the fuel line 37 and into the pump cylinder 35, thence into the equalizing chamber 39, the float raising and lowering accordingly. The equalizing chamber 39 supplies the fuel to the jet 46, and maintains it at a level just below the tip of the jet as follows; the float 41 forms a ground joint with the walls of the chamber and as the float falls, it closes the overflow port 42, causing the chamber to fill with fuel, this raises the float, opens the overflow port, and the excess fuel flows back to the main supply line, now, when the port 51 in the ring valve 50 is in alignment with the port 51 in the shell 8 and also with the port 65 provided in the spoke of the ring cage, air from the reservoir 18 flows into the Venturi tube, and as the piston is rotated to bring the passage 65 into alignment with the port 51 in the ring 50 a charge of vaporized fuel is drawn through the manifold and into the combustion chamber, this charge is then fired by the spark plug 75 to drive the piston.

The mechanism is of course properly timed so that the explosions occur in the various cylinders 52ᵃ in proper relation, and so that a continuous flow of power is assured, the flow of fuel being controlled by means of the choke rod 99 as above described.

From the foregoing description it will be obvious that we have perfected a very simple, practical, inexpensive and substantial rotary engine.

What we claim is:—

1. In a rotary engine comprising a cylinder block, a stationary center shaft, a rotatable cylindrical member journaled thereon and having a drive shaft connected thereto, an air reservoir in said rotatable member and having a fuel chamber therein, an intake manifold connected thereto, means for compressing air in said reservoir, cylinders provided in said block and embracing said rotatable cylindrical member, opposed abutment sections mounted on said block, ring cages mounted on said rotatable member and normally sealing said cylinders, and a piston mounted on each of said ring cages.

2. In a rotary engine comprising a cylinder block, a rotatable cylindrical member journaled thereon and having a drive shaft connected thereto, an air reservoir in said member, fuel vaporizing mechanism mounted therein, means for forcing air into said reservoir, a cylinder formed in said block and embracing said rotatable member, a grooved ring cage, a piston mounted on said ring cage, transversely disposed abutments mounted in said cylinder, and means engaging the grooves in said ring cage for actuating said abutments.

3. In a rotary engine including a cylinder block, a rotatable cylindrical member mounted therein and having a drive shaft connected thereto, cylinders formed in said block and embracing said rotatable member and having abutments mounted thereon, means for forcing a fuel mixture under pressure into said cylinders, cylindrical ring cages on said rotatable member and adapted to seal said cylinders, pistons mounted thereon, and means actuated by said rotatable member for actuating said abutments.

4. In a rotary engine including a cylinder block, a rotatable member mounted therein and having a drive shaft connected thereto, an air reservoir in said member, fuel vaporizing mechanism mounted in said reservoir, means for forcing air into said reservoir, cylinders in said block, valves mounted therein, a ring cage mounted on the rotatable member and forming a seal for the cylinders, a piston mounted on each ring cage, means for actuating said valves, and means for feeding fuel into said cylinders.

5. In a rotary engine including a sectional cylinder block, a rotatable member mounted therein and having a drive shaft connected thereto, an air reservoir, fuel vaporizing mechanism mounted therein and including a fuel chamber, means for compressing air into said reservoir, valves mounted on said cylinder block, a ring cage secured on the rotatable member and forming a seal with the cylinders, a piston mounted on the ring cage, and a port in each ring cage adapted when in certain positions to admit fuel to each cylinder.

6. In a rotary engine including a cylinder block, a rotatable cylindrical member having a drive shaft connected thereto, an air reservoir in said member, fuel vaporizing mechanism mounted therein, means for forcing air into said reservoir, an intake manifold connected to the vaporizing mechanism, cylinders in said block, abutments mounted thereon, a ring cage mounted on the rotatable member and provided with a port adapted in certain position to register with the intake manifold, a piston mounted on the ring cage, and means engaging said rotatable member for actuating said abutments.

7. A rotary engine including a cylinder block, a hollow stationary shaft mounted therein, a rotatable member mounted thereon and a drive shaft connected thereto, cylinders surrounding said rotatable member and forming an oil chamber therebetween, means for forcing a fuel mixture, under pressure, into said cylinders, abutments on said block, a ring cage, a piston mounted on said ring cage, and means on said block and engaging said ring cage for actuating said abutments.

8. A rotary engine comprising a sectional cylinder block having a plurality of cylinders formed therein, a stationary hollow shaft, a rotatable member mounted on said shaft and provided with pistons adapted to travel in said cylinders, abutments mounted on the cylinder block, means for actuating said abutments, and means for forcing a fuel mixture under pressure into said cylinders.

9. A rotary engine including an air reservoir having a fuel chamber therein, means for forcing air into said reservoir, a rotatable cylindrical member surrounding said reservoir, a cylinder block having a plurality of cylinders therein, valves mounted thereon, pistons mounted on the rotatable member and adapted to travel in said cylinders, means for actuating said valves, and means for forcing fuel to said cylinders.

10. A rotary engine including an air reservoir having a fuel chamber therein, an intake manifold connected to said fuel chamber, means for compressing air in said reservoir, a rotatable cylindrical member, a cylinder block surrounding said member, abutments mounted on said block, pistons on the rotatable member and adapted to travel in said cylinders, and means for forcing fuel under pressure into said cylinders when the rotatable member is in a predetermined position.

11. A rotary engine comprising a compressor housing having an air reservoir therein, an intake manifold, a fuel chamber connected thereto, means for feeding fuel to said chamber, a rotatable member surrounding said housing, a cylinder block including a plurality of cylinders, abutments interposed in each cylinder, pistons mounted on said rotatable member, compressors in said housing, and cam plates on said rotatable member for actuating said compressors.

12. A rotary engine comprising a compressor housing having a plurality of pistons mounted in the end walls thereof, an air reservoir, an intake manifold, a fuel chamber connected thereto, a rotatable member surrounding said housing, a cylinder block having a plurality of cylinders therein, abutments interposed in said cylinders, pistons mounted on said rotatable member and adapted to travel in said cylinders, a cam plate mounted on said rotatable members for actuating said first mentioned pistons to force air into the reservoir, and means for feeding a fuel to said fuel chamber.

13. A rotary engine comprising a compressor housing having a plurality of pistons mounted in the end walls thereof, an air reservoir, an intake manifold, a fuel chamber connected thereto, a rotatable member surrounding said housing, a cylinder block, including a plurality of cylinders, abutments interposed in said cylinders, pistons mounted on said rotatable member and adapted to travel in said cylinders, and a pump connected to one of the compressor pistons for forcing fuel to said fuel chamber.

14. A rotary engine including a cylinder block, a rotatable cylindrical member mounted therein and provided with end walls, an air reservoir, an equalizing chamber in said reservoir, an intake manifold connected to said chamber, cylinders in said block, abutments in said cylinders, pistons mounted to travel in said cylinders, and connected to said rotatable member, and ports in said rotatable member adapted in certain predetermined positions to register with said manifold for admitting fuel to each of said cylinders.

15. A rotary engine including an air reservoir having a fuel chamber therein, means for forcing air into said reservoir, a rotatable cylindrical member surrounding said reservoir, a cylinder block having a plurality of cylinders therein, abutments mounted thereon, pistons mounted on the rotatable member and adapted to travel in said cylinders, means for actuating said abutments, an intake manifold connected to said fuel chamber, and a port in said member for admitting fuel to said cylinders when said member is in a certain predetermined position.

16. A rotary engine including a sectional cylinder block, a stationary shaft mounted therein, a rotatable member mounted thereon and having a drive shaft connected thereto, cylinders surrounding said rotatable member, pistons mounted on the rotatable member and adapted to travel in said cylinders, means for forcing fuel under pressure to said cylinders, abutments mounted in the cylinders, means engageable with said rotatable member for actuating said abutments, a fan housing, and a casing surrounding said cylinder block and communicating with said fan housing.

GUY HICKERSON.
JOHN McCREADIE.